No. 704,389. Patented July 8, 1902.
R. C. SCOTT.
ART OF AGING OR TREATING SPIRITS.
(Application filed Feb. 24, 1902.)
(No Model.) 2 Sheets—Sheet 1.
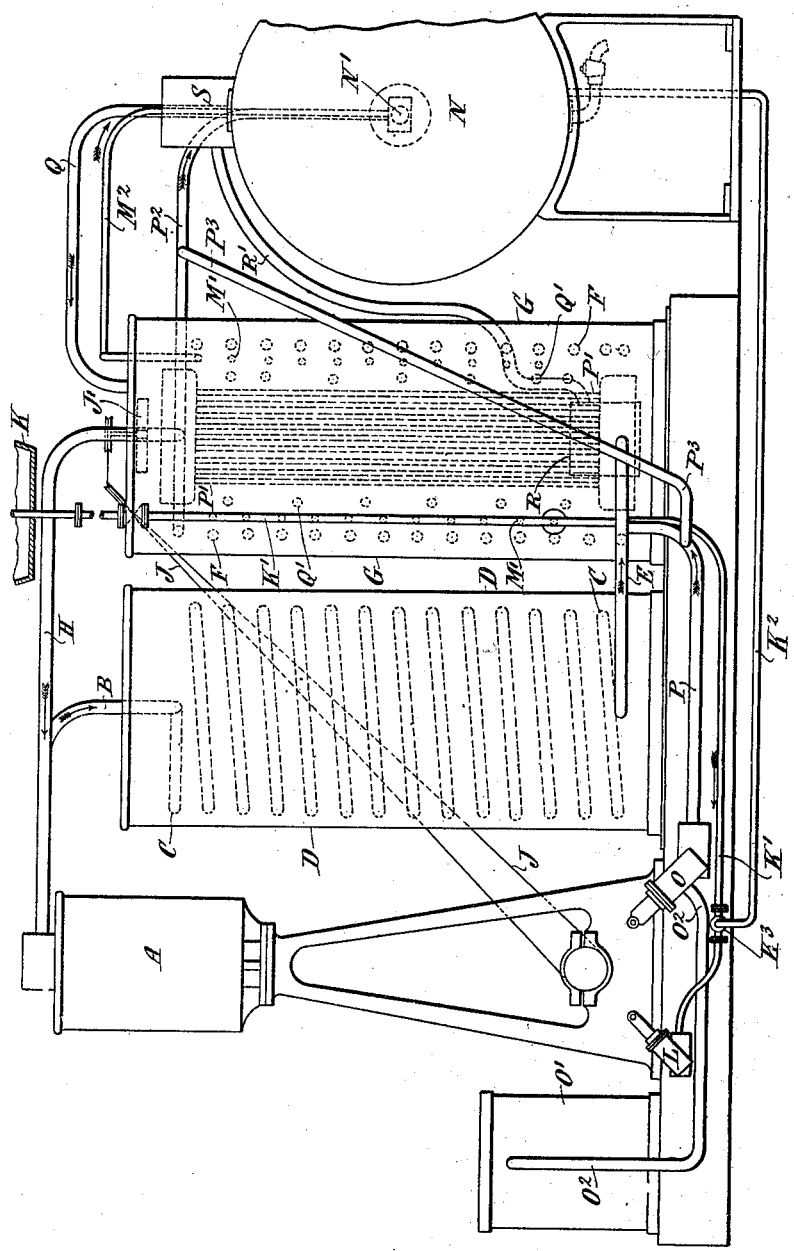
Witnesses
A. M. Parkins.
J. A. MacDonald.
Inventor.
Richard Clarkson Scott,
By his Attorneys,
Baldwin Davidson Wight.

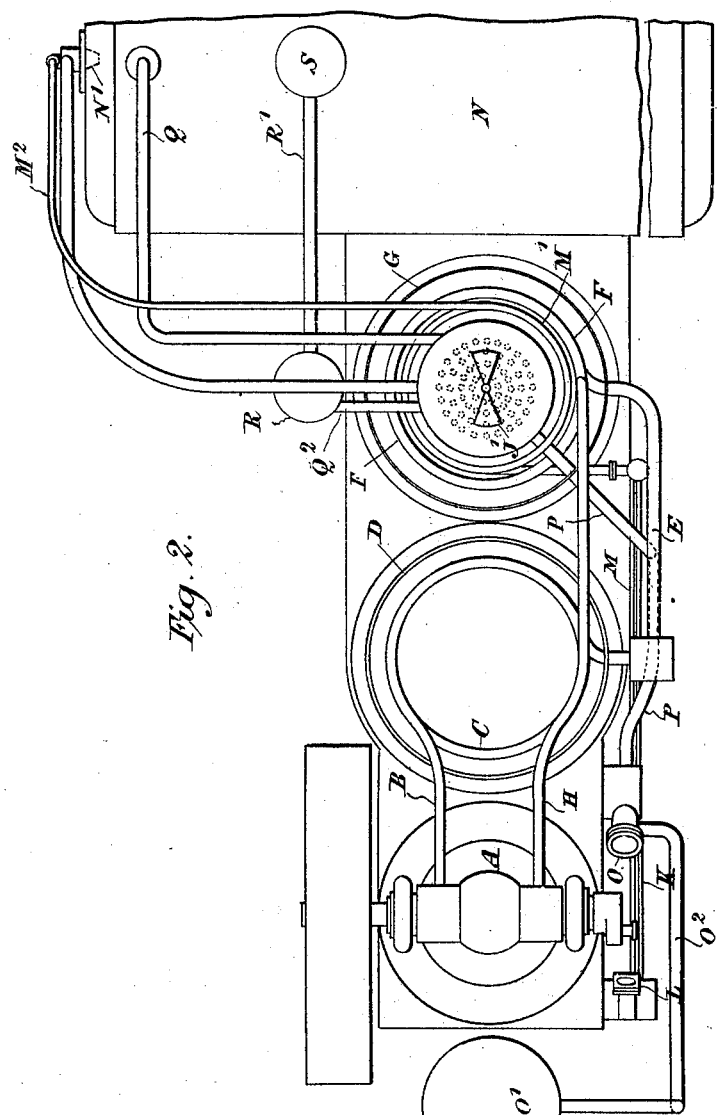

UNITED STATES PATENT OFFICE.

RICHARD CLARKSON SCOTT, OF LIVERPOOL, ENGLAND.

ART OF AGING OR TREATING SPIRITS.

SPECIFICATION forming part of Letters Patent No. 704,389, dated July 8, 1902.

Application filed February 24, 1902. Serial No. 95,441. (No model.)

*To all whom it may concern:*

Be it known that I, RICHARD CLARKSON SCOTT, manufacturer, a subject of the King of Great Britain, residing at 23 Drury Buildings, 21 Water street, Liverpool, England, have invented a certain new and useful Improvement in the Art of Aging or Treating Spirits, of which the following is a specification.

In the specification of my former patent, No. 532,399, I have described processes for treating spirits, in which the air vessel is cooled to about 32° Fahrenheit or below, and the spirit is cooled to the same temperature. I have now discovered that it is not always necessary to cool the air. In these cases the spirit is cooled to about 32° Fahrenheit or below and is sprayed with a stream of air at the normal temperature. The temperature of the spirit in the vessel in which the spraying takes place should be maintained at about 32° Fahrenheit or below. I find that with some classes of spirits it is beneficial to use air at the normal temperature alternatively with cooled air.

Figure 1 is an elevation, and Fig. 2 a plan, of an apparatus for carrying out the invention.

In this apparatus the air and spirit are cooled by ammonia, or other suitable gas may be employed.

A is the pump by which the ammonia is compressed into the pipe B and coil C, the latter being in the vessel D, through which a stream of cold water is continuously passed. The coil C is connected by the pipe E with the coil F in the vessel G, containing brine, and the top of the coil F is connected with the pipe H, which leads the ammonia back to the pump A.

J is a band driving the turbine J' for circulating the brine in the vessel G.

Apparatus of this class is well known and requires no further description.

K is a vessel containing spirit, which is led by the pipe K' to the pump L, whence it passes by the pipe M up through the coil M' in the vessel G and by the pipe M² to the sprayer N' in the vessel N.

K² is a pipe connecting the bottom of the vessel N to the pipe K', and K³ is a cock at the junction, so that spirit can be supplied to the pump either from K or N.

O is a pump drawing in air through the washer O' through the pipe O² and forcing it when it is desired to cool it by the pipe P, nest of tubes P', (in the vessel G,) and pipe P² to the sprayer N'. A by-pass P³ is provided leading from the pipe P to the pipe P² to allow the air to pass directly to the sprayer N' without passing through the nest of tubes P'.

Q is a pipe connected to the top of the vessel N above the sprayer. It leads the impure air from the vessel N to the top of the coil Q' in the vessel G, and so by the pipe Q² to the vessel R, in which condensation collects and may be drawn off from time to time, the air passing by a pipe R' to an outlet S.

Since the grant of my patent above referred to I have discovered that different classes of spirit require different treatments in order to economically cleanse or age them or remove injurious products, such as furfurol. Brandy is a much more delicate spirit than whisky—*i. e.*, gives off its alcohol more readily—and pot-still whisky is more delicate than patent-still. When cold air is used, the evaporation of alcohol is not so rapid as when warmer air or air at normal or natural temperature—*i. e.*, above 32° Fahrenheit—is employed. It is also true that different brands of the different classes of brandy, pot-still, patent-still, and other classes of spirits, vary in delicacy or the readiness with which they give off alcohol when subjected to the action of air. Hence in practicing my process I adapt the treatment to the nature of the spirit. When it is possible to do so, air at normal temperature is employed; but if the evaporation of alcohol or other ingredients which it is desired to save is too rapid cold air is used. Brandy is generally treated with cold air throughout the process, while pot-still whisky is preferably treated with warmer air; but if the treatment results in too much loss of alcohol the treatment by warm air is stopped, and the cold-air treatment is resorted to for a time at least. Afterward the warm-air treatment may be renewed. With patent-still whisky I preferably use warm air or air at ordinary temperature, because when warm air is used the cost of refrigeration is saved; but when the evaporation of alcohol is too great the cold-air treatment is employed. In all cases the spirit itself is cooled to a temperature of 32° or below in order to prevent loss of its bulk or strength. In general it may be stated that the apparatus is operated to supply either cold or warm air, according to circumstances. When the evaporation is too rapid, cold air is used; but when warm air can be used without loss it is employed. It will be observed that the apparatus is adapted to supply the sprayer with either cold or warm air. When cold air is used, it passes through the pipes P' of the refrigerator; but when warm air is to be used it is made to traverse the by-pass pipe $P^3$, a suitable cock, of course, being employed to direct the air either through the by-pass or through the pipe P'. The time required to treat the spirit depends on the size of the vessels, the pressure, the temperature, and the amount of spirit dealt with. If the vessel N contains one hundred and forty gallons, I preferably treat seventy gallons of spirit at one time, and if the pressure is from twenty to twenty-five pounds the process would take from two and three-fourths to four hours. The spirit is drawn out from the bottom of the spraying vessel through the pipe $K^2$ and is continually circulated through the apparatus by means of the pump L, which takes the spirit from the pipe $K^2$ through the cock $K^3$ and delivers it to the sprayer through the pipes M, M', and $M^2$. When necessary, the cock $K^3$ may be set to cause the pump to draw the spirit from the pipe K' instead of from the pipe $K^2$. If the process in treating a charge of spirit like that above described is worked for four hours, the spirit will pass about seven times through the sprayer. The air passes only once through the apparatus. It carries away with it the injurious products, the presence of which in the air as it emerges from the apparatus is distinctly perceptible, while the alcohol or other ingredients which it is desired to save are not carried off.

What I claim is—

1. The herein-described art of treating spirit by cooling it to about 32° Fahrenheit or below and spraying it in a stream of constantly-changing air at a warmer temperature.

2. The herein-described art of treating spirit by cooling it to about 32° Fahrenheit or below and spraying it in a stream of constantly-changing air alternately at a warmer temperature and at about 32° Fahrenheit or below.

RICHARD CLARKSON SCOTT.

Witnesses:
FREDK. C. WEATHERLY,
JOHN H. WHITEHEAD.